United States Patent [19]
Yabuki et al.

[11] Patent Number: 5,824,740
[45] Date of Patent: *Oct. 20, 1998

[54] GOLF BALL

[75] Inventors: Yoshikazu Yabuki; Yoshinori Sano, both of Sirakawa; Hiroaki Tanaka, Kobe, all of Japan

[73] Assignee: Sumitomo Rubber Industries, Ltd., Hyogo-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 580,249

[22] Filed: Dec. 28, 1995

[30] Foreign Application Priority Data

Dec. 29, 1994 [JP] Japan .................................... 6-338789
Dec. 29, 1994 [JP] Japan .................................... 6-338790

[51] Int. Cl.$^6$ .................................................... A63B 37/12
[52] U.S. Cl. ............................... 525/71; 525/72; 525/74; 525/93; 473/378; 473/372; 473/385
[58] Field of Search .................................. 525/71, 72, 74, 525/93, 94; 473/378, 372, 385

[56] References Cited

U.S. PATENT DOCUMENTS

| | | | |
|---|---|---|---|
| 4,985,545 | 1/1991 | Sullivan | 273/235 R |
| 4,994,508 | 2/1991 | Shiraki | 525/74 |
| 5,066,726 | 11/1991 | Modic | 525/263 |
| 5,504,156 | 4/1996 | Takezaki | 525/93 |

FOREIGN PATENT DOCUMENTS

| | | |
|---|---|---|
| 0557069 | 8/1993 | European Pat. Off. . |
| 0652254 | 5/1995 | European Pat. Off. . |

*Primary Examiner*—David Buttner
*Attorney, Agent, or Firm*—Birch, Stewart, Kolasch & Birch, LLP

[57] ABSTRACT

Disclosed is a golf ball having good shot feel and controllability as well as satisfactory flight performance and cut resistance. The golf ball has a core and a cover for covering the core, wherein said cover has a stiffness modulus of 100 to 250 MPa and comprises a heated mixture of an ionomer resin and a glycidyl group-modified styrene-based block copolymer having a JIS-A hardness of 30 to 90 as base resin, and optionally a maleic anhydride-modified olefin copolymer.

19 Claims, 2 Drawing Sheets

GOLF BALL

FIELD OF THE INVENTION

The present invention relates to a golf ball. More particularly, it relates to a golf ball having good shot feel and controllability as well as satisfactory flight performance and cut resistance.

BACKGROUND OF THE INVENTION

Recently, an ionomer resin has widely been used as a base resin for a cover of the golf ball (e.g. Japanese Patent Publication No. 49-27093). Particularly, the ionomer resin is exclusively used as the base resin for a cover in a two-piece solid golf ball using a solid core. This is because the ionomer resin is superior in durability, cut resistance and coefficient of restitution (C.O.R.) and, it is easily processed.

However, the ionomer resin is inferior in shot feel and controllability (ease of putting spin on the ball) in comparison with a balata (transpolyisoprene) resin used as the base resin for a cover of a thread wound golf ball since the ionomer resin has considerably high hardness and rigidity.

Therefore, an improvement of shot feel and controllability by softening the ionomer resin with various means has been made.

For example, Japanese Laid-Open Patent Publication Nos. 1(1989)-308577 and 5(1993)-3931 suggest that a high-rigid ionomer resin is softened by blending or mixing a soft ionomer resin to improve shot feel and controllability, wherein the soft ionomer resin is obtained by neutralizing a terpolymer of an α-olefin, an unsaturated carboxylic acid (e.g. acrylic acid, methacrylic acid, etc.) and an acrylate with a sodium or zinc ion.

However, even if the soft ionomer resin as described above is blended, shot feel similar to a balata covered golf ball has not been obtained. Further, blending of the soft ionomer resin is accompanied by deterioration of the coefficient of restitution and flight performance and, therefore, satisfactory results have not been obtained.

In addition, Japanese Laid-Open Patent Publication No. 5(1993)-220240 suggests that shot feel and controllability are improved by blending an ionomer resin and a polymer containing a glycidyl group. According to this method, an improvement effect with respect to shot feel and controllability is admitted, but satisfactory results have not been obtained with respect to coefficient of restitution and flight performance, because the polymer containing a glycidyl group to be blended has not been clearly defined and is difficult to select.

As described above, the golf ball using the ionomer resin as the base resin for a cover is inferior in shot feel and controllability. In addition, a suggestion to improve shot feel and controllability causes deterioration of the coefficient of restitution and flight performance, and satisfactory results have not been obtained.

OBJECTS OF THE INVENTION

Under these circumstances, in order to attain excellent shot feel and controllability, which are similar to those of the balata covered golf ball, as well as excellent flight performance and cut resistance due to the ionomer resin, the present inventors have intensively studied the base resin for a cover. As a result, it has been found that, when a heated mixture of an ionomer resin and a soft glycidyl group-modified styrene-based block copolymer is used as the base resin for a cover, a golf ball having good shot feel and controllability, as well as satisfactory flight performance and cut resistance can be obtained. Thus, the present invention has been completed.

A main object of the present invention is to provide a golf ball having good shot feel and controllability as well as satisfactory flight performance and cut resistance.

This object as well as other objects and advantages of the present invention will become apparent to those skilled in the art from the following description with reference to the accompanying drawings.

SUMMARY OF THE INVENTION

Figure 1:
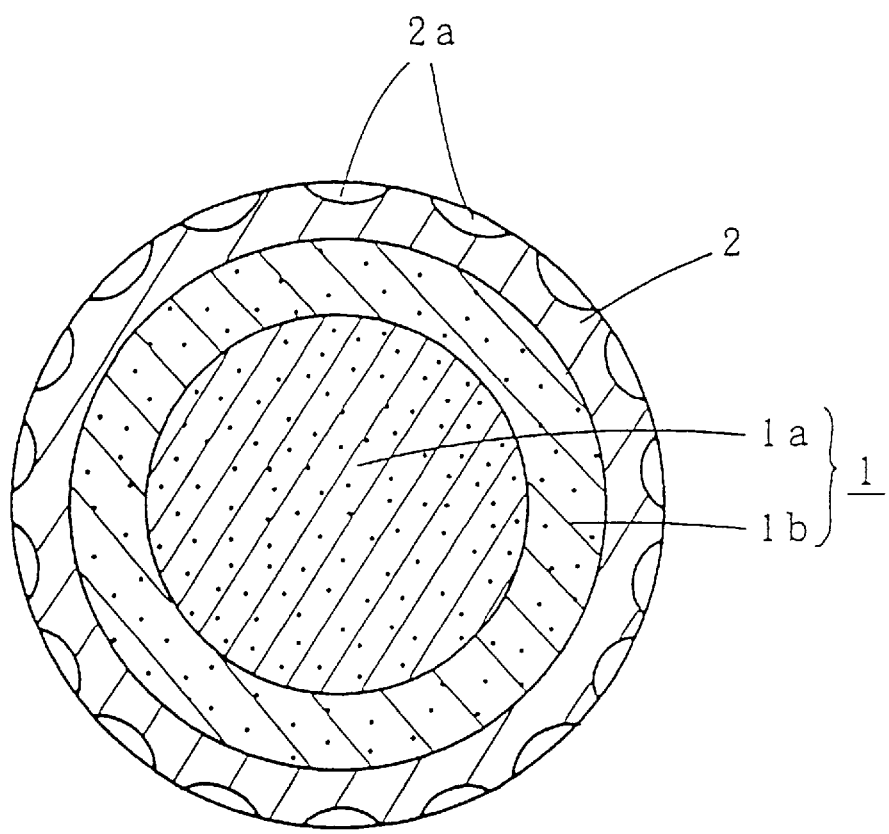
FIG. 1 is a schematic cross section illustrating one embodiment of the golf ball of the present invention.

The present invention provides a golf ball having a core and a cover for covering the core, wherein the cover has a stiffness modulus of 100 to 250 MPa and comprises a heated mixture of an ionomer resin and a glycidyl group-modified styrene-based block copolymer having a JIS-A hardness of 30 to 90 as base resin.

The present invention also provide a golf ball having a core and a cover for covering the core, wherein said cover has a stiffness modulus of 100 to 250 MPa and comprises a heated mixture of an ionomer resin, a maleic anhydride-modified olefin copolymer and a glycidyl group-modified styrene-based block copolymer having a JIS-A hardness of 30 to 90 as base resin.

DETAILED DESCRIPTION OF THE INVENTION

In the present invention, when the ionomer resin and the glycidyl group-modified styrene-based block copolymer are mixed together with heating, a glycidyl group contained in the glycidyl group-modified styrene-based block copolymer reacts with a free carboxyl group in the ionomer resin to form a soft block or graft copolymer at the interface. Furthermore, the copolymers are finely dispersed in the matrix of the ionomer resin, uniformly, by a shear force at the time of kneading and the ionomer resin is softened, thereby improving the coefficient of restitution.

Accordingly, when using the heated mixture of the ionomer resin and glycidyl group-modified styrene-based block copolymer as base resin of the cover, shot feel and controllability are improved and, at the same time, deterioration of flight performance (coefficient of restitution) and cut resistance is inhibited, thereby obtaining a golf ball having good shot feel and controllability as well as satisfactory flight performance and cut resistance.

In the present invention, the ionomer resin and the glycidyl group-modified styrene-based block copolymer having a JIS-A hardness of 30 to 90 are represented as the components (A) and (B), respectively, just for the sake of convenience. The ionomer resin as the component (A) is obtained, for example, by neutralizing at least a part of carboxyl groups in a copolymer of an α-olefin and an α, β-unsaturated carboxylic acid having 3 to 8 carbon atoms with metal ion, or neutralizing at least a part of carboxyl groups in a terpolymer of an α-olefin, an α, β-unsaturated carboxylic acid having 3 to 8 carbon atoms and an α, β-unsaturated carboxylate with metal ion.

The α-olefin includes ethylene, propylene, 1-butene 1-pentene, etc. Among them, ethylene is particularly preferred. Examples of the α, β-unsaturated carboxylic acid having 3 to 8 carbon atoms are acrylic acid, methacrylic acid, fumaric acid, maleic acid, crotonic acid, etc. Among them, acrylic acid and methacrylic acid are particularly preferred. Examples of the unsaturated carboxylic acid ester are alkyl acrylate, alkyl methacrylate, alkyl fumarate and alkyl maleate wherein the alkyl group includes methyl, ethyl, propyl, n-butyl, isobutyl, etc. Among them, acrylate and methacrylate are particularly preferred. Examples of the metal ion with which at least a part of carboxyl groups in the copolymer of the α-ethylene and α, β-unsaturated carboxylic acid or the terpolymer of the α-ethylene, α, β-unsaturated carboxylic acid and α, β-unsaturated carboxylate include sodium ion, lithium ion, zinc ion, magnesium ion, potassium ion, etc.

Examples of the above ionomer resin are commercially avalable under several trade names. Examples of those commercially available from Mitsui Du Pont Polychemical Co., Ltd. include ionomer resins such as Hi-milan 1605, (Na), Hi-milan 1707 (Na), Hi-milan AM7318, (Na), Hi-milan 1706 (Zn), Hi-milan AM7315 (Zn), Hi-milan AM7317 (Zn), Hi-milan AM7311 (Mg), Hi-milan MK7320 (K), etc.; terpolymer ionomer resins such as Hi-milan 1856 (Na), Hi-milan 1855 (Zn), Hi-milan AM7316 (Zn), etc. Examples of those commercially available from Du Pont U.S.A. Co. include ionomer resins such as Surlyn 8920 (Na), Surlyn 8940 (Na), Surlyn AD8512 (Na), Surlyn 9910 (Zn), Surlyn AD8511 (Zn), Surlyn 7930 (Li), Surlyn 7940 (Li), etc.; terpolymer ionomer resins such as Surlyn AD8265 (Na), Surlyn AD8269 (Na), etc. Examples of those commercially available from Exxon chemical Co. include ionomer resins such as Iotek 7010 (Zn), Iotek 8000 (Na), etc. Note that Na, Zn, K, Li, Mg, etc., which are described in parentheses at the back of the trade name of the above ionomer resin show neutralization metal ion species, respectively. In the present invention, as the ionomer resin of the component (A), a mixture of an ionomer resin neutralized with the above described monovalent metal ion and an ionomer resin neutralized with the divalent metal ion may be used.

In the present invention, the glycidyl group-modified styrene-based block copolymer as the component (B) means a styrene-based block copolymer modified with a glycidyl group. The styrene-block copolymer moiety in the component (B) is a block copolymer having polystyrene (S) at both terminal ends. As the intermediate phase, there are basic three sorts such as polybutadiene (B), polyisoprene (I) and hydrogenated type poly(ethylene-butyrene) (EB) and they are abbreviated to SBS, SIS and SEBS, respectively. The component (B) is composed by adding a glycidyl group to these copolymers. The compounds for introducing the glycidyl group includes unsaturated glycidyl esters, unsaturated glycidyl ethers, epoxyalkenes, p-glycidylstyrenes, etc. Examples thereof are glycidyl methacrylate, glycidyl acrylate, glycidyl itaconate, allyl glycidyl ether, 2-methylallyl glycidyl ether, p-glycidylstyrene, etc. The styrene-based block copolymer moiety in the component (B) may be SBS, SIS, SEBS, etc., as described above. Among them, SEBS is particularly preferred in view of coefficient of restitution, weather resistance and heat aging resistance.

In addition, in order to soften the ionomer resin of the component (A), it is necessary that JIS-A hardness of the glycidyl group-modified styrene-based block copolymer of the component (B) is 30 to 90, preferably 45 to 88. When the hardness of the glycidyl group-modified styrene-based block copolymer as the component (B) is lower than 30, the cover is ecomes too soft, which results in deterioration of cut resistance. On the other hand, when the hardness of the glycidyl group-modified styrene-based block copolymer of the component (B) is higher than 90, softening can not be accomplished sufficiently and properties of the ionomer resin appear strongly, which results in deterioration of shot feel and controllability. The JIS-A hardness means a hardness measured using a JIS-A hardness tester.

The styrene content of the styrene block copolymer moiety in the component (B) is preferably 10 to 40% by weight, particularly 15 to 35% by weight. When the styrene content is smaller than 10% by weight, the cover is too soft, which results in deterioration of cut resistance. On the other hand, when the styrene content is larger than 40% by weight, softening can not be accomplished sufficiently and properties of the ionomer resin appear strongly, which results in deterioration of shot feel and controllability.

In addition, the glycidyl group content of the glycidyl group-modified styrene-based block copolymer of the component (B) is preferably 0.05 to 10% by weight, particularly 0.2 to 5% by weight. When the glycidyl group content is smaller than 0.05% by weight, the amount of the reaction between the glycidyl group and free carboxyl group in the ionomer resin is small and the dispersion of the glycidyl group-modified styrene-based block copolymer as the component (B) into the ionomer resin as the component (A) is deteriorated, which results in deterioration of the durability. On the other hand, when the glycidyl group content is larger than 10% by weight, the amount of the reaction between the glycidyl group and free carboxyl group in the ionomer resin becomes too large and the fluidity is inferior. Therefore, it is difficult to mold the golf ball.

The glycidyl group-modified styrene-based block copolymer of the component (B) is commercially available and, for example, glycidyl methacrylate adducts of hydrogenated styrene-butadiene-styrene block copolymers (SEBS) which are commercially available from Asahi Kasei Industries Co., Ltd. under the trade name of "Taftek Z513" and "Taftek Z514", and these are suitably used in the present invention.

In the present invention, the base resin for cover is composed of the heated mixture of the ionomer resin as the component (A) and glycidyl group-modified styrene-based block copolymer as the component (B) and it is necessary that the stiffness modulus of the cover composition, which contains the heated mixture, is within a range of 100 to 250 MPa. When the stiffness modulus of the cover composition is lower than 100 MPa, the cover is too soft and spin amount is too large. Therefore, flight distance is decreased and cut resistance is deteriorated. When the stiffness modulus of the cover composition is higher than 250 MPa, it is impossible to obtain a suitable backspin amount and, therefore, controllability is deteriorated and hit feeling also is inferior. The cover composition is mainly composed of the heated mixture of the ionomer resin as the component (A) and the glycidyl group-modified styrene-based block copolymer (B), and a small amount of titanium dioxide, barium sulfate, etc. is merely added. Therefore, the stiffness modulus is substantially the same as that of the heated mixture of the ionomer resin of the component (A) and glycidyl group-modified styrene-based block copolymer of the component (B).

In the present invention, the mixing ratio of the ionomer resin of the component (A) to the glycidyl group-modified styrene-based block copolymer of the component (B) is preferably within a range of 95:5 to 50:50, particularly 90:10 to 55:45. When the proportion of the ionomer resin is larger than the above range, softening can not be accomplished sufficiently and properties of the ionomer resin appear strongly, which results in deterioration of shot feel and controllability. On the other hand, when the proportion of the ionomer resin is smaller than the above range, the cover is too soft and spin amount is increased. Therefore, flight distance is decreased and cut resistance is deteriorated.

In the present invention, it is possible to obtain desired characteristics by mixing the ionomer resin of the component (A) and the glycidyl group-modified styrene-based block copolymer of the component (B) together with heating. They are normally mixed with heating at 150° to 260° C., using internal mixers such as a kneading type twin-screw extruder, a Banbury, a kneader, etc.

In another embodiment of the present invention, the maleic anhydride-modified olefin copolymer (component (C)) may be contained, in addition to the above components (A) and (B). The maleic anhydride-modified olefin copolymer (C) may be one which contains polyolefin blocks as the copolymer component, which is compatible with the ionomer resin. The olefin preferably has 2 to 8 carbon atoms and examples thereof include ethylene, propylene, 1-butene, isobutylene, 1-pentene, 1-octene, etc. Among them, ethylene and propylene are particularly preferred.

In addition, monomer components other than olefin may be added to the maleic anhydride-modified olefin copolymer for the purpose of softening. Examples of the monomer component include acrylates such as methyl acrylate, ethyl acrylate, butyl acrylate, etc.; methacrylates such as methyl methacrylate, ethyl methacrylate, butyl methacrylate, etc.; vinyl aceate, etc. Among them, acrylates and methacrylates are preferred taking compatibility with ionomer resin into consideration.

The maleic anhydride-modified olefin copolymer includes various grades of maleic anhydride adducts of hydrogenated styrene-butadiene-styrene block copolymers commercially available from Asahi Kasei Industries Co., Ltd. under the trade name of "TUFTEC M series". In addition various grades of ethylene-ethyl acrylate-maleic anhydride terpolymers are commercially available from Sumitomo Chemical Industries Co., Ltd. under the trade name of "Bondine" and graft-modified products of ethylene-ethyl acrylate copolymers due to maleic anhydride are commercially available from Mitsui Du Pont Polychemical Co., Ltd. under the trade name of "AR series".

In addition, the maleic anhydride-modified olefin copolymer is formulated for the purpose of softening of the ionomer resin, and the stiffness modulus is lower than that of the ethylene-methacrylic acid copolymer or ethylene-acrylic acid copolymer high-rigid ionomer resin of which stiffness modulus of these copolymers is normally 250 to 350 MPa. It is therefore preferred that the stiffness modulus is about 1 to 100 MPa.

When using the three components (A), (B) and (C), the composition ratio of three sorts of resins is preferably as follows. That is, the proportion of the ionomer resin (A), maleic anhydride-modified olefin copolymer (C) and glycidyl group-modified styrene-based block copolymer (B) is 30 to 70% by weight, 10 to 69.5% by weight and 0.5 to 20% by weight, respectively.

That is, when the proportion of the ionomer resin (A) is smaller than 30% by weight, the flight performance and cut resistance are deteriorated. On the other hand, when the proportion of the ionomer resin is larger than 70% by weight, softening can not be accomplished sufficiently, which results in deterioration of shot feel and controllability.

When the proportion of the maleic anhydride-modified olefin copolymer (C) is smaller than 10% by weight, softening of the ionomer resin can not be accomplished sufficiently. On the other hand, when the proportion of the maleic anhydride-modified olefin copolymer (C) is larger than 69.5% by weight, the flight performance and cut resistance are deteriorated. Therefore, it is impossible to obtain a satisfactory golf ball.

When the amount of the glycidyl group-modified styrene-based block copolymer (B) is less than 0.5% by weight, the amount of the reaction between the glycidyl group and a free carboxyl group in the ionomer resin or maleic anhydride in the maleic anhydride-modified olefin copolymer is small. As a result, the dispersion of the maleic anhydride-modified olefin copolymer into the ionomer resin is deteriorated and the flight performance and durability become inferior. On the other hand, when the amount of the glycidyl group-modified styrene-based block copolymer (B) is larger than 20% by weight, the reaction between the glycidyl group and free carboxyl group in the ionomer resin or maleic anhydride in the maleic anhydride-modified olefin copolymer proceeds excessively. Therefore, it is difficult to mold the cover because of deterioration of the fluidity of the resin.

In the present invention, it is possible to obtain desired characteristics by mixing the above two or three sorts of resins with heating. They are normally mixed with heating at 150° to 260° C. for 0.5 to 15 minutes, using internal mixers such as a kneading type twin-screw extruder, a Banbury mixer, a kneader, etc.

Further, a very small amount of water contained in the resin is sufficient for water content required to the reaction between the maleic anhydride and glycidyl group. In addition, about 0.1 to 0.2% by weight of water content may be optionally added to mix the resins with heating.

In the present invention, when the base resin for the cover is composed of the heated mixture of the ionomer resin (A), maleic anhydride-modified olefin copolymer (C) and glycidyl group-modified styrene-based block copolymer (B) as base resin. A stiffness modulus of the cover composition must be within a range of 100 to 250 MPa. When the stiffness modulus of the cover composition is lower than 100 MPa, the cover is too soft and spin amount is too large. Therefore, flight distance is decreased and cut resistance is deteriorated. When the stiffness modulus of the cover composition is higher than 250 MPa, it is impossible to obtain a suitable backspin amount and, therefore, controllability is deteriorated and shot feel also is inferior. The cover composition is mainly composed of the heated mixture of the ionomer resin, maleic anhydride-modified olefin copolymer and glycidyl group-modified styrene-based block copolymer, and a small amount of titanium dioxide, barium sulfate, etc. is merely added. Therefore, the stiffness modulus is substantially the same as that of the heated mixture of the ionomer resin, maleic anhydride-modified olefin copolymer and glycidyl group-modified styrene-based block copolymer.

Various additives such as pigments, dispersants, antioxidants, UV absorbers, photostabilizers, etc. can be optionally formulated in the cover to be used in the present invention, in addition to the mixture of the above three sorts of resins as the components (A), (B) and (C). In addition, another resin can also be added unless characteristics of the heated mixture of the above resins are not deteriorated. When the other resin is added to form a base resin of the cover as described above, an amount of the heated mixture of the above resins is preferably not less than 70% by weight, particularly not less than 80% by weight. In the present invention, "the heated mixture of the ionomer resin (A), maleic anhydride-modified olefin copolymer (C) and glycidyl group-modified styrene-based block copolymer (B) is used as base resin of the cover" means the case that the base resin of the cover is composed of the heated mixture of the ionomer resin, maleic anhydride-modified olefin copolymer and glycidyl group-modified styrene-based block copolymer or the case that the other resin is added to the above mixture to form the base resin of the cover. In the present invention, the heated mixture of the ionomer resin, maleic anhydride-modified olefin copolymer and glycidyl group-modified styrene-based block copolymer may be previously mixed, followed by mixing with the other resin. In addition, the mixture may be mixed with the other additives when the cover composition is prepared.

Further, a golf ball can be obtained by covering the cover on the core. As the core, any of a core for solid golf ball (solid core) and a core for thread wound golf ball (thread wound core) can be used.

The solid core may be not only a core of a two-piece golf ball, but also a core with two or more layers of a multi-layer golf ball. For example, the core for a two-piece golf ball is obtained by subjecting a rubber composition to a press vulcanization to compress with heating (e.g. at a temperature of 140° to 170° C. for 10 to 40 minutes) into a spherical vulcanized article can be used, the rubber composition being prepared by formulating 10 to 60 parts by weight of at least one vulcanizing agent (crosslinking agent) of $\alpha$, $\beta$-ethylenically unsaturated carboxylic acids (e.g. acrylic acid, methacrylic acid, etc.) or metal salts thereof and functional monomers (e.g. trimethylolpropane trimethacrylate, etc.), 10 to 30 parts by weight of a filler (e.g. zinc oxide, barium sulfate, etc.), 0.5 to 5 parts by weight of a peroxide (e.g. dicumyl peroxide, etc.) and 0.1 to 1 parts by weight of an antioxidant, based on 100 parts by weight of polybutadiene.

The thread wound core may be composed of a center and a thread rubber wound on the center. As the center, any of a liquid center and a rubber center can be used. As the rubber center, there can be used those obtained by vulcanizing the same rubber composition as that of the solid core.

The thread rubber may be those which have hitherto been used. For example, there can be used those obtained by vulcanizing a rubber composition wherein an antioxidant, a vulcanizing accelerator and sulfur are formulated in a natural rubber or a natural rubber and synthetic polyisoprene. The core is not limited to the solid core or thread wound core.

A method of covering the cover on the core is not specifically limited, but may be a normal method. For example, there can be used a method comprising molding a cover composition, which contains the heated mixture of the ionomer resin (A), maleic anhydride-modified olefin copolymer (C) and glycidyl group-modified styrene-based block copolymer (B), into a semi-spherical half-shell in advance, covering a core with two half-shells and then subjecting to a pressure molding at 130° to 170° C. for 5 to 15 minutes, or a method comprising subjecting the cover composition to an injection molding directly to cover the core. The thickness of the cover is normally about 1 to 4 mm. In case of cover molding, a dimple may be formed on the surface of the ball, if necessary. Further, if necessary, a paint or marking may be provided after cover molding.

The structure of the golf ball of the present invention will be explained with reference to the accompanying drawing.

FIG. 1 is a schematic cross section illustrating one embodiment of the golf ball of the present invention. The golf ball shown in FIG. 1 is a thread wound golf ball. In FIG. 1, 1 is a core comprising a center 1a and a thread rubber 1b, 2 is a cover and 2a is a dimple.

The center 1a and thread rubber 1b are not specifically limited, and those which are similar to a conventional one can be used. As the center 1a, a liquid or rubber center may be used. The thread rubber 1b is wound around the center 1a in a stretched state, thereby forming a core 1 referred to as a thread core. The cover 2 is that for covering the core 1. The cover 2 is formed from the above cover composition of the present invention.

Figure 2:
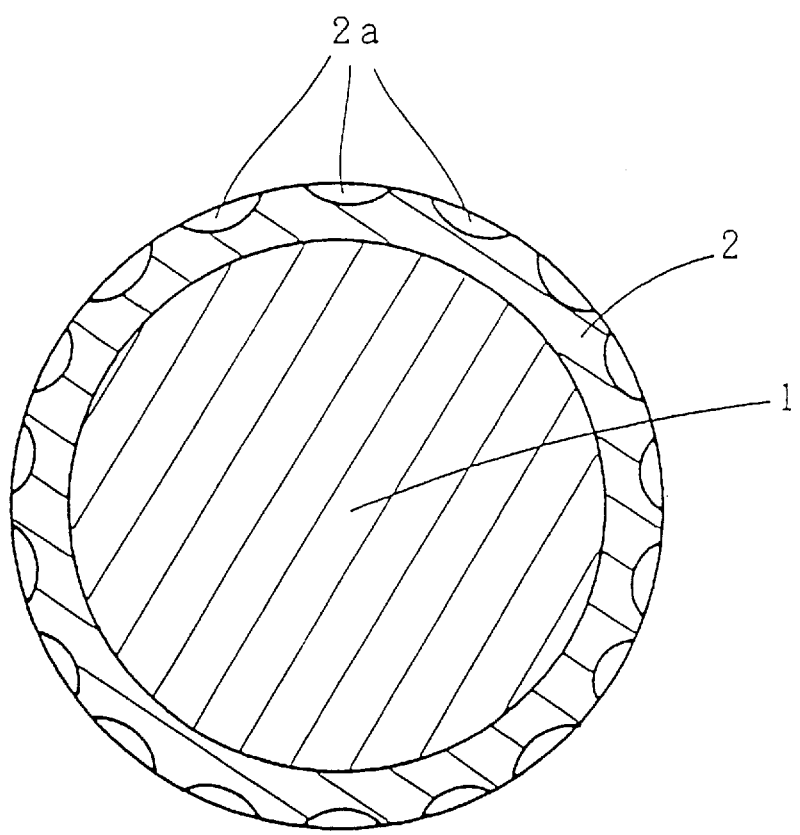
FIG. 2 is a schematic cross section illustrating another embodiment of the golf ball of the present invention.

FIG. 2 is a schematic cross section illustrating another embodiment of the golf ball of the present invention. The golf ball shown in FIG. 2 is a two-piece golf ball comprising a core 1 and a cover 2 for covering the core. The core 1 is referred to as a solid core but is not specifically limited, for example, a vulcanized product of a rubber composition comprising polybutadiene as a main material as described above. The cover 2 for covering the core is formed from the above cover composition of the present invention. In addition, 2a is a dimple provided on the cover 2. In the golf ball shown in FIG. 2, the core 1 is composed of a vulcanized molded product of a single-layer rubber, but it may also be a two-layer solid core obtained by further forming an outer core of a vulcanized molded product of a rubber composition comprising polybutadiene as a main material around an inner core of a vulcanized molded product of a rubber composition comprising polybutadiene as a main material.

A suitable number/embodiment of dimples 2a are optionally provided on the cover 2 of the golf ball so that desired characteristics may be obtained. In addition, painting or marking is optionally provided on the surface of the golf ball.

As described above, according to the present invention, there is provided a golf ball which is superior in shot feel, controllability, flight performance, durability and cut resistance.

EXAMPLES

The following Examples and Comparative Examples further illustrate the present invention in detail but are not to be construed to limit the scope thereof.

Examples 1 to 9 and Comparative Examples 1 to 6
(thread wound golf ball)

Thread wound golf balls of Examples 1 to 9 and Comparative Examples 1 to 6 were produced through the following processes (1) to (3).
(1) Production of core A thread wound core having an outer diameter of 39.5 mm was produced by winding a thread rubber comprising a natural rubber/low-cis isoprene rubber [Shell IR-309 (trade name)] (=50:50) as the base rubber on a liquid center having an outer diameter of 28.1 mm, said liquid center comprising a paste obtained by dispersing barium sulfate in water and a center bag of a vulcanized natural rubber having a thickness of 1.7 mm, which covers the paste.
(2) Production of cover composition The formulation components shown in Tables 1 to 3 were mixed using a kneading type twin-screw extruder to obtain a pelletized cover composition. Further, the composition of the compositions for cover of Preparation Examples 1 to 5 to be used for the golf balls of Examples 1 to 5 and the stiffness modulus are shown in Table 1. The composition of the compositions for cover of Preparation Examples 6 to 9 to be used for the golf balls of Examples 6 to 9 and the stiffness modulus are shown in Table 2. The composition of the compositions for cover of Comparative Preparation Examples 1 to 6 to be used for the golf balls of Comparative Examples 1 to 6 and the stiffness modulus are shown in Table 3. In addition, the amount of each component to be formulated in the tables is represented by parts by weight, and it is also the same in the following tables. In the tables, the ionomer resin as the component (A) and the glycidyl group-modified styrene-based block copolymer as the component (B) are represented by the trade name, and the details will be explained at the back of Table 3 in order. Regarding Comparative Preparation Example 6 to be used as the cover composition of the golf ball of Comparative Example 6, the formulation component is not shown in Table 3 and is shown at the back of Table 3 as *17 because of its balata cover.

The extrusion conditions are as follows: a screw diameter: 45 mm; a screw revolution per minute: 200 rpm; a screw L/D: 35. The formulation components were heated at 220° to 260° C. at the die position of the extruder. The stiffness modulus is measured according to ASTM D-747 after a sheet having a thickness of about 2 mm obtained by heat-press molding was preserved at 23° C. for two weeks.

The compositions for cover of Comparative Preparation Examples 1 to 6 to be used for the cover of the golf balls of Comparative Examples 1 to 6 will be explained. The composition of Comparative Preparation Example 1 is a cover composition wherein only a high-rigid ionomer resin is used as the base resin, and the cover composition of Comparative Preparation Example 1 corresponds to a conventional standard composition for ionomer cover. In addition, the cover composition of Comparative Preparation Example 6 is a standard composition for balata cover. The golf ball of Comparative Example 1 wherein the cover composition of Comparative Preparation Example 1 is used and golf ball of Comparative Example 6 wherein the cover composition of Comparative Preparation Example 6 is used are golf balls for a criterion of comparison. In addition, the cover composition of Comparative Examples 2 to 5 are compositions for cover wherein a high-rigid ionomer is used in combination with a terpolymer soft ionomer resin as the base resin.

(3) Production of golf ball

A thread wound golf ball was obtained by molding a semispherical half-shell from the cover composition of the above item (2), covering the core of the item (1) with two half-shells and then subjecting to a press molding in a die for the golf ball. The thread wound golf ball was coated with a paint to give a coated golf ball of 42.7 mm in outer diameter.

The ball weight, ball compression, ball initial velocity, flight distance (carry) and spin of the golf ball thus obtained were measured. The ball compression was measured by PGA method, and the ball initial velocity was measured by R & A initial velocity measuring method. The flight distance was measured by hitting with a No. 1 wood club at a head speed of 45 m/second, using a swing robot manufactured by True Temper Co. Spin was measured by hitting with a No. 9 iron club at a head speed of 34 m/second, using a swing robot manufactured by True Temper Co., and then taking a photograph of a mark provided on the hit golf ball using a high-speed camera.

Furthermore, in order to examine cut resistance of the golf balls of the Examples 1 to 9 and Comparative Examples 1 to 6, the top part of the golf ball was hit at a head speed of 30 m/second using a swing robot mounted with a pitching wedge manufactured by True Temper Co. to examine whether a cut mark is arisen or not. The evaluation criteria are as follows.

Evaluation criteria:
◯: No cut mark is formed.
Δ: Slight cut mark is formed.
X: Large cut mark is formed.
XX: Large cut mark which can not stand use is formed.

Further, in order to examine the durability of the above golf ball, a golf ball was hit at a head speed of 45 m/second using a swing robot mounted with a No. 1 wood club manufactured by True Temper Co., and the number of times until breakage was arisen was measured. The resulting value was indicated as a durability index in case of the number of Comparative Example 6 being 100.

Further, shot feel and the control properties of the resulting golf ball were evaluated by 10 top professional golfers according to a practical hitting test. The evaluation criteria are as follows. The results shown in the Tables below are based on the fact that not less than 8 out of 10 professional golfers evaluated with the same criterion about each test item.

Evaluation criteria:
◯: Good, shot feel and control properties are similar to those of the golf ball with the balata cover.
Δ: Control properties are similar to those of the golf ball with the balata cover, but shot feel is quite different from that of the golf ball with the balata cover, that is, it is too heavy, which results in too strong impact, or it is too soft, which results in heavy feeling.
X: Both shot feel and control properties are inferior.

In Table 4, the ball weight, ball compression, ball initial velocity, flight distance, spin, cut resistance, durability, shot feel and controllability of the golf balls of Examples 1 to 5 as well as kind of the cover composition used in the production of the golf ball are shown. Those of the gold balls of Examples 6 to 9, those of the golf balls of Comparative Examples 1 to 3 and those of the golf balls of Comparative Examples 4 to 6 are shown in Tables 5, 6 and 7, respectively.

TABLE 1

| | Preparation Example No. | | | | |
|---|---|---|---|---|---|
| | 1 | 2 | 3 | 4 | 5 |
| Hi-milan 1605 *1 | 25 | 22.5 | 0 | 0 | 0 |
| Hi-milan 1707 *2 | 0 | 0 | 20 | 0 | 0 |
| Hi-milan AM7318 *3 | 0 | 0 | 0 | 20 | 0 |
| Hi-milan 1856 *4 | 0 | 0 | 0 | 40 | 0 |
| Hi-milan 1706 *5 | 25 | 22.5 | 20 | 0 | 25 |
| Hi-milan AM7317 *6 | 0 | 0 | 0 | 20 | 0 |
| Hi-milan 1855 *7 | 35 | 40 | 40 | 0 | 35 |
| Hi-milan MK7320 *8 | 0 | 0 | 0 | 0 | 25 |
| TUFTEC Z513 *14 | 15 | 0 | 0 | 20 | 0 |
| TUFTEC Z514 *15 | 0 | 15 | 20 | 0 | 15 |
| Titanium dioxide | 2.0 | 2.0 | 2.0 | 2.0 | 2.0 |
| Barium sulfate | 2.0 | 2.0 | 2.0 | 2.0 | 2.0 |
| Stiffness modulus (MPa) | 175 | 150 | 125 | 185 | 155 |

TABLE 2

| | Preparation Example No. | | | |
|---|---|---|---|---|
| | 6 | 7 | 8 | 9 |
| Hi-milan 1706 *5 | 0 | 30 | 0 | 0 |
| Hi-milan AM7317 *6 | 0 | 0 | 30 | 0 |
| Hi-milan 1855 *7 | 0 | 20 | 25 | 40 |
| Surlyn AD8512 *9 | 25 | 0 | 0 | 20 |
| Surlyn AD8269 *10 | 10 | 0 | 0 | 0 |
| Surlyn AD8511 *11 | 25 | 0 | 0 | 20 |
| Surlyn 7940 *12 | 0 | 30 | 0 | 0 |

TABLE 2-continued

| | Preparation Example No. | | | |
|---|---|---|---|---|
| | 6 | 7 | 8 | 9 |
| Iotek 8000 *13 | 0 | 0 | 30 | 0 |
| TUFTEC Z514 *15 | 40 | 20 | 15 | 0 |
| TUFTEC trial product *16 | 0 | 0 | 0 | 20 |
| Titanium dioxide | 2.0 | 2.0 | 2.0 | 2.0 |
| Barium sulfate | 2.0 | 2.0 | 2.0 | 2.0 |
| Stiffness modulus (MPa) | 160 | 200 | 215 | 145 |

TABLE 3

| | Comparative Preparation Example No | | | | | |
|---|---|---|---|---|---|---|
| | 1 | 2 | 3 | 4 | 5 | 6 |
| Hi-milan 1605 *1 | 50 | 30 | 0 | 0 | 15 | Balata cover *17 |
| Hi-milan AM7318 *3 | 0 | 0 | 25 | 0 | 0 | |
| Hi-milan 1706 *5 | 50 | 30 | 0 | 60 | 15 | |
| Hi-milan AM7317 *6 | 0 | 0 | 25 | 0 | 0 | |
| Hi-milan 1855 *7 | 0 | 0 | 0 | 40 | 70 | |
| Surlyn AD8269 *10 | 0 | 40 | 50 | 0 | 0 | |
| Titanium dioxide | 2.0 | 2.0 | 2.0 | 2.0 | 2.0 | |
| Barium sulfate | 2.0 | 2.0 | 2.0 | 2.0 | 2.0 | |
| Stiffness modulus (MPa) | 340 | 160 | 200 | 180 | 150 | — |

*1: Hi-milan 1605 (trade name), ethylene-methacrylic acid copolymer ionomer resin obtained by neutralizing with a sodium ion, manufactured by Mitsui Du Pont Polychemical Co., MI (melt index): 2.8, stiffness modulus: 310 MPa, Shore D-scale hardness: 62,
*2: Hi-milan 1707 (trade name), ethylene-methacrylic acid copolymer ionomer resin obtained by neutralizing with a sodium ion, manufactured by Mitsui Du Pont Polychemical Co., MI: 0.9, stiffness modulus: 320 MPa, Shore D-scale hardness: 63
*3: Hi-milan AM7318 (trade name), ethylene-methacrylic acid copolymer ionomer resin obtained by neutralizing with a sodium ion, manufactured by Mitsui Du Pont Polychemical Co., MI: 2.1, stiffness modulus: 345 MPa, Shore D-scale hardness: 65
*4: Hi-milan 1856 (trade name), ethylene-butyl acrylate-methacrylic acid terpolymer ionomer resin obtained by neutralizing with a sodium ion, manufactured by Mitsui Du Pont Polychemical Co., MI: 1.0, stiffness modulus: 85 MPa, Shore D-scale hardness: 53
*5: Hi-milan 1706 (trade name), ethylene-methacrylic acid copolymer ionomer resin obtained by neutralizing with a zinc ion, manufactured by Mitsui Du Pont Polychemical Co., MI: 0.8, stiffness modulus: 260 MPa, Shore D-scale hardness: 61
*6: Hi-milan AM7317 (trade name), ethylene-methacrylic acid copolymer ionomer resin obtained by neutralizing with a zinc ion, manufactured by Mitsui Du Pont Polychemical Co., MI: 1.2, stiffness modulus: 310 MPa, Shore D-scale hardness: 64
*7: Hi-milan 1855 (trade name), ethylene-butyl acrylate-methacrylic acid terpolymer ionomer resin obtained by neutralizing with a zinc ion, manufactured by Mitsui Du Pont Polychemical Co., MI: 1.0, stiffness modulus: 90 MPa, Shore D-scale hardness: 55
*8: Hi-milan MK7320 (trade name), ethylene-methacrylic acid copolymer ionomer resin obtained by neutralizing with a potassium ion, manufactured by Mitsui Du Pont Polychemical Co., MI: 2.8, stiffness modulus: 290 MPa, Shore D-scale hardness: 61
*9: Surlyn AD8612 (trade name), ethylene-methacrylic acid copolymer ionomer resin obtained by neutralizing with a sodium ion, manufactured by Du Pont Co., MI: 4.4, stiffness modulus. 280 MPa, Shore D-scale hardness: 62
*10: Surlyn AD8269 (trade name), ethylene-butyl acrylate-methacrylic acid terpolymer resin obtained by neutralizing with a zinc ion, manufactured by Du Pont Co., MI: 1.0, stiffness modulus: 26 MPa, Shore D-scale hardness: 36
*11: Surlyn AD8511 (trade name), ethylene-methacrylic acid copolymer ionomer resin obtained by neutralizing with a zinc ion, manufactured by Du Pont Co., MI: 3.4, stiffness modulus: 220 MPa, Shore D-scale hardness: 60
*12: Surlyn 7940 (trade name), ethylene-methacrylic acid copolymer ionomer resin obtained by neutralizing with a lithium ion, manufactured by Du Pont Co., MI: 2.8, stiffness modulus: 350 MPa, Shore D-scale hardness: 63
*13: Iotek 8000 (trade name), ethylene-acrylic acid copolymer ionomer resin obtained by neutralizing with a sodium ion, manufactured by Exxon Chemical Co., MI: 0.8, stiffness modulus: 370 MPa, Shore D-scale hardness: 64
*14: TUFTEC Z513 (trade name), glycidyl methacrylate adduct of hydrogenated styrene-butadiene-styrene block copolymer, manufactured by Asahi Kasei Industries Co. Ltd., styrene content: about 30% by weight, hydrogenated butadiene content: about 70% by weight, glycidyl methacrylate content: about 1% by weight, JIS-A hardness: 84
*15: TUFTEC Z514 (trade name), hydrogenated glycidyl methacrylate adduct of hydrogenated styrene-butadiene-styrene block copolymer, manufactured by Asahi Kasei Industries Co. Ltd., styrene content: about 20% by weight, hydrogenated butadiene content: about 80% by weight, glycidyl methacrylate content: about 1% by weight, JIS-A hardness: 65
*16: TUFTEC trial product, glycidyl methacrylate adduct of hydrogenated styrene-butadiene-styrene block copolymer, manufactured by Asahi Kasei Industries Co. Ltd., styrene content: about 20% by weight, hydrogenated butadiene content: about 80% by weight, glycidyl methacrylate content: about 0.5% by weight, JIS-A hardness: 65
*17: Balata cover Normal composition for balata cover

TABLE 4

| | Example No. | | | | |
|---|---|---|---|---|---|
| | 1 | 2 | 3 | 4 | 5 |
| Cover composition (Preparation Example No.) | 1 | 2 | 3 | 4 | 5 |
| Ball weight (g) | 45.4 | 45.4 | 45.3 | 45.3 | 45.3 |
| Ball compression (PGA) | 87 | 85 | 84 | 87 | 86 |
| Ball initial velocity (feet/second) | 252.9 | 252.7 | 252.5 | 253.0 | 252.7 |
| Flight distance (yard) | 229 | 228 | 227 | 229 | 228 |
| Spin (rpm) | 8500 | 8600 | 8650 | 8400 | 8600 |
| Cut resistance | ◯ | ◯ | ◯ | ◯ | ◯ |
| Durability (index) | 250 | 275 | 300 | 250 | 275 |
| Shot feel and controllability | ◯ | ◯ | ◯ | ◯ | ◯ |

TABLE 5

| | Example No. | | | |
|---|---|---|---|---|
| | 6 | 7 | 8 | 9 |
| Cover composition (Preparation Example No.) | 6 | 7 | 8 | 9 |
| Ball weight (g) | 45.4 | 45.4 | 45.3 | 45.3 |
| Ball compression (PGA) | 86 | 88 | 89 | 85 |
| Ball initial velocity (feet/second) | 252.8 | 253.0 | 253.2 | 252.6 |
| Flight distance (yard) | 228 | 229 | 230 | 228 |
| Spin (rpm) | 8550 | 8350 | 8300 | 8650 |
| Cut resistance | ◯ | ◯ | ◯ | ◯ |
| Durability (index) | 263 | 195 | 238 | 300 |
| Shot feel and controllability | ◯ | ◯ | ◯ | ◯ |

TABLE 6

| | Comparative Example No. | | |
|---|---|---|---|
| | 1 | 2 | 3 |
| Cover composition (Comparative Preparation Example No.) | 1 | 2 | 3 |
| Ball weight (g) | 45.3 | 45.3 | 45.4 |
| Ball compression (PGA) | 92 | 87 | 88 |
| Ball initial velocity (feet/second) | 253.0 | 251.0 | 251.2 |
| Flight distance (yard) | 230 | 222 | 223 |
| Spin (rpm) | 7000 | 8100 | 7800 |
| Cut resistance | ◯ | ◯ | ◯ |
| Durability (index) | 150 | 243 | 225 |
| Shot feel and controllability | X | ◯ | Δ |

TABLE 7

|  | Comparative Example No. | | |
| --- | --- | --- | --- |
|  | 4 | 5 | 6 |
| Cover composition | 4 | 5 | 6 |
| (Comparative Preparation Example No.) | | | |
| Ball weight (g) | 45.3 | 45.4 | 45.3 |
| Ball compression (PGA) | 88 | 86 | 87 |
| Ball initial velocity (feet/second) | 251.1 | 250.8 | 251.0 |
| Flight distance (yard) | 222 | 221 | 223 |
| Spin (rpm) | 7900 | 8150 | 8500 |
| Cut resistance | ○ | Δ | XX |
| Durability (index) | 213 | 220 | 100 |
| Shot feel and controllability | Δ | Δ | ○ |

As is apparent from a comparison between the characteristics of the golf balls of Examples 1 to 9 shown in Tables 4 to 5 and those of the golf balls of Comparative Examples 1 to 6 shown in Tables 6 to 7, all golf balls of Examples 1 to 9 had excellent shot feel, controllability and spin performance, which are similar to those of the golf balls with the balata cover of Comparative Example 6 for a criterion of comparison. And besides, they attained the flight distance of 227 to 230 yards, which is almost the same as that of the golf ball of Comparative Example 1 wherein only a high-rigid ionomer resin is used as the base resin. Cut resistance was also the same as that of the golf ball of Comparative Example 1 and it reached a satisfactory level. In addition, the golf balls of Examples 1 to 9 were considerably superior in durability in comparison with the golf balls of Comparative Examples 1 and 6.

To the contrary, the golf ball of Comparative Example 1 as the thread wound golf ball with a standard ionomer cover wherein only a high-rigid ionomer resin is used as the cover resin of the cover showed a hard shot feel and was inferior in controllability. Regarding the golf balls of Comparative Examples 2 to 5 wherein the mixture of the high-rigid ionomer resin and terpolymer soft ionomer resin is used as the base resin of the cover, the spin performance and controllability were similar to those of the golf ball with the balata cover but shot feel was not satisfactory. And besides, the flight distance was 221 to 223 yards and was considerably inferior in comparison with that of the golf balls of Examples 1 to 9. Regarding the normal thread wound golf ball with balata cover of Comparative Example 6, shot feel, controllability and spin performance are excellent, but the flight distance was 223 yards and was considerably inferior in comparison with the golf balls of Examples 1 to 9. Cut resistance is particularly inferior and the durability became half to one-third of those of the golf balls of Examples 1 to 9 and was considearably inferior.

Examples 10 to 18 and Comparative Examples 7 to 12 (two-piece solid golf ball)

(1) Production of core

A rubber composition prepared by formulating 36 parts by weight of zinc acrylate, 20 parts by weight of zinc oxide, 1.2 parts by weight of dicumyl peroxide and 0.5 parts by weight of an antioxidant [Yoshinox 425 (trade name), manufactured by Yoshitomi Seiyaku Co., Ltd.] in 100 parts by weight of a polybutadiene rubber [BR-11 (trade name), manufactured by Japan Synthetic Rubber Co., Ltd] was subjected to a vulcanization molding at 160° C. for 25 minutes to give a solid core. The average diameter of the solid core thus obtained was 38.2 mm.

(2) Preparation of cover composition

The pelletized compositions for the cover prepared in Preparation Examples 1 to 9 and Comparative Preparation Examples 1 to 5 were used.

(3) Production of golf ball

The cover composition obtained in the above item (2) was covered on the solid core obtained in the above item (1) by an injection molding to give a coated golf ball of 42.7 mm in diameter.

The ball weight, ball compression, ball initial velocity, flight distance, spin, cut resistance and durability of the golf ball thus obtained were measured and, further, shot feel and controllability were examined.

In Table 8, the ball weight, ball compression, ball initial velocity, flight distance, spin, cut resistance, durability, shot feel and controllability of the golf balls of Examples 10 to 14 as well as kind of the cover composition used in the production of the golf ball are shown. Those of the golf balls of Examples 15 to 18 anindex in case of the impact resistance number of Comparative Example 7 being 100.

TABLE 8

|  | Preparation Example No. | | | | |
| --- | --- | --- | --- | --- | --- |
|  | 10 | 11 | 12 | 13 | 14 |
| Cover composition | 1 | 2 | 3 | 4 | 5 |
| (Preparation Example No.) | | | | | |
| Ball weight (g) | 45.4 | 45.4 | 45.3 | 45.3 | 45.4 |
| Ball compression (PGA) | 91 | 90 | 89 | 91 | 90 |
| Ball initial velocity (feet/second) | 253.1 | 253.0 | 252.9 | 253.2 | 253.0 |
| Flight distance (yard) | 233 | 232 | 232 | 234 | 232 |
| Spin (rpm) | 8450 | 8500 | 8600 | 8350 | 8500 |
| Cut resistance | ○ | ○ | ○ | ○ | ○ |
| Durability (index) | 167 | 175 | 183 | 163 | 175 |
| Shot feel and controllability | ○ | ○ | ○ | ○ | ○ |

TABLE 9

|  | Example No. | | | |
| --- | --- | --- | --- | --- |
|  | 15 | 16 | 17 | 18 |
| Cover composition | 6 | 7 | 8 | 9 |
| (Preparation Example No.) | | | | |
| Ball weight (g) | 45.4 | 45.3 | 45.3 | 45.4 |
| Ball compression (PGA) | 90 | 92 | 92 | 89 |
| Ball initial velocity (feet/second) | 253.0 | 253.3 | 253.3 | 253.0 |
| Flight distance (yard) | 233 | 234 | 234 | 232 |
| Spin (rpm) | 8450 | 8350 | 8300 | 8550 |
| Cut resistance | ○ | ○ | ○ | ○ |
| Durability (index) | 172 | 162 | 160 | 183 |
| Shot feel and controllability | ○ | ○ | ○ | ○ |

TABLE 10

|  | Comparative Example No. | | | | |
| --- | --- | --- | --- | --- | --- |
|  | 7 | 8 | 9 | 10 | 11 |
| Cover composition | 1 | 2 | 3 | 4 | 5 |
| (Comparative Preparation Example No.) | | | | | |
| Ball weight (g) | 45.4 | 45.3 | 45.3 | 45.4 | 45.3 |
| Ball compression (PGA) | 96 | 92 | 93 | 93 | 92 |
| Ball initial velocity (feet/second) | 253.3 | 251.3 | 251.5 | 251.5 | 251.3 |
| Flight distance (yard) | 233 | 225 | 226 | 226 | 225 |
| Spin (rpm) | 6800 | 7700 | 7500 | 7450 | 7900 |
| Cut resistance | ○ | ○ | ○ | ○ | ○ |

TABLE 10-continued

| | Comparative Example No. | | | | |
|---|---|---|---|---|---|
| | 7 | 8 | 9 | 10 | 11 |
| Durability (index) | 100 | 145 | 150 | 142 | 147 |
| Shot feel and controllability | X | Δ | Δ | Δ | Δ |

As is apparent from a comparison between the characteristics of the golf balls of Examples 10 to 18 shown in Tables 8 to 9 and those of the golf balls of Comparative Examples 7 to 11 shown in Table 10, the two-piece solid golf balls of Examples 10 to 18 of the present invention had excellent shot feel, controllability and spin performance, similar to the thread wound golf balls of Example 1 to 9. And besides, they attained the flight distance of 232 to 234 yards, which is almost the same as that of the golf ball of Comparative Example 7 wherein only a high-rigid ionomer resin is used as the base resin. Cut resistance reached a satisfactory level. In addition, the golf balls of Examples 10 to 18 were considerably superior in durability to the golf ball of Comparative Example 7.

To the contrary, the golf ball of Comparative Example 7 as a normal two-piece solid golf ball using only a high-rigid ionomer resin as the cover resin of the cover showed excellent flight performance and cut resistance, but was inferior in shot feel and controllability. The golf balls of Comparative Examples 8 to 11 using the high-rigid ionomer resin in combination with the terpolymer soft ionomer resin as the base resin were inferior in shot feel and controllability to the golf balls of Examples 10 to 18, and was also inferior in flight distance to the golf balls of Examples 10 to 18.

Examples 19 to 28 and Comparative Examples 12 to 19 (thread wound golf ball)

Thread wound golf balls of Examples 19 to 28 and Comparative Examples 12 to 19 were produced through the following processes (1) to (3).

(1) Production of core

A thread wound core having an outer diameter of 39.5 mm was produced by winding a thread rubber comprising a natural rubber/low-cis isoprene rubber [Shell IR-309 (trade name)] (=50:50) as the base rubber on a liquid center having an outer diameter of 28.1 mm, said liquid center comprising a paste obtained by dispersing barium sulfate in water and a center bag of a vulcanized natural rubber having a thickness of 1.7 mm, which covers the paste.

(2) Production of cover composition

The formulation components shown in Tables 11 to 14 were mixed using a kneading type twin-screw extruder to obtain a pelletized cover composition. Further, the composition of the compositions for cover of Preparation Examples 10 to 14 to be used for the golf balls of Examples 19 to 23 and the stiffness modulus are shown in Table 11. The composition of the compositions for cover of Preparation Examples 15 to 19 to be used for the golf balls of Examples 24 to 28 and the stiffness modulus are shown in Table 12. The composition of the compositions for cover of Comparative Preparation Examples 7 to 10 to be used for the golf balls of Comparative Examples 12 to 15 and the stiffness modulus are shown in Table 13. The composition of the compositions for cover of Comparative Preparation Examples 11 to 14 to be used for the golf balls of Comparative Examples 16 to 19 and the stiffness modulus are shown in Table 14. Further, the composition of the compositions for cover of Preparation Example 20 to be used for the golf ball of Examples 33 and the stiffness modulus are shown in Table 12. In addition, the amount of each component to be formulated in the tables is represented by parts by weight, and it is also the same in the following tables. In the tables, the ionomer resin, maleic anhydride-modified olefin copolymer and glycidyl group-modified styrene-based block copolymer are represented by the trade name, and the details will be explained at the back of Table 14 in the order of the ionomer resin, maleic anhydride-modified olefin copolymer and glycidyl group-modified styrene-based block copolymer. Regarding Comparative Preparation Example 14 to be used as the cover composition of the golf ball of Comparative Example 19, the formulation component is not shown in Table 14 and is shown at the back of Table 14 as *14 because of its balata cover.

The extrusion conditions are as follows: a screw diameter: 45 mm; a screw revolution per minute: 200 rpm; a screw L/D: 35. The formulation components were heated at 220° to 260° C. at the die position of the extruder. The stiffness modulus is measured according to ASTM D-747 after a sheet having a thickness of about 2 mm obtained by heat-press molding was preserved at 23° C. for two weeks.

Among the compositions for cover of Comparative Preparation Examples to be used for the cover of the golf balls of Comparative Examples, typical one for a criterion of comparison will be explained. The composition of Comparative Preparation Example 12 is a cover composition wherein only a high-rigid ionomer resin is used as the base resin, and the cover composition of Comparative Preparation Example 12 corresponds to a conventional standard composition for ionomer cover. In addition, the cover composition of Comparative Preparation Example 14 is a standard composition for balata cover. The golf ball of Comparative Example 12 wherein the cover composition of Comparative Preparation Example 12 is used and golf ball of Comparative Example 14 wherein the cover composition of Comparative Preparation Example 19 is used are golf balls for a criterion of comparison, (3) Production of golf ball A thread wound golf ball was obtained by molding a semi-spherical half-shell from the cover composition of the above item (2) and then covering the core of the item (1) with two half-shells. The thread wound golf ball was coated with a paint to give a coated golf ball of 42.7 mm in outer diameter.

The ball weight, ball compression, ball initial velocity, flight distance (carry) and spin of the golf ball thus obtained were measured, and the durability and cut resistance were examined.

The ball compression was measured by PGA method, and the ball initial velocity was measured by R & A initial velocity measuring method. The flight distance was measured by hitting with a No. 1 wood club at a head speed of 45 m/second, using a swing robot manufactured by True Temper Co. Spin was measured by hitting with a No. 9 iron club at a head speed of 34 m/second, using a swing robot mounted with a No. 9 iron club manufactured by True Temper Co., and then taking a photograph of a mark provided on the hit golf ball using a high-speed camera.

In addition, the durability was evaluated as follows. That is, a golf ball was hit at a head speed of 45 m/second using a swing robot mounted with a No. 1 wood club manufactured by True Temper Co., and the number of times until breakage was arisen was measured. The resulting value was indicated as an index in case of the value of the golf ball of Comparative Example 19 being 100.

Furthermore, cut resistance was evaluated as follows. That is, the top part of the golf ball was hit at a head speed of 30 m/second using a swing robot mounted with a pitching wedge manufactured by True Temper Co. to examine whether a cut mark is arisen or not. The evaluation criteria are as follows.

Evaluation criteria

○: No cut mark is formed.
Δ: Slight cut mark is formed.
X: Large cut mark is formed.
XX: Large cut mark which can not stand use is formed.

Further, shot feel and controllability of the resulting golf ball were evaluated by 10 top professional golfers according to a practical hitting test. The evaluation criteria are as follows. The results shown in the Tables below are based on the fact that not less than 8 out of 10 professional golfers evaluated with the same criterion about each test item.

Shot feel

○: Good, impact force is small, soft feeling
X: Inferior

Controlability

○: Good, spin is easily put when using an iron club, soft feeling
X: Inferior

In Table 15, the ball weight, ball compression, ball initial velocity, flight distance, spin, durability, cut resistance, shot feel and controllability of the golf balls of Examples 19 to 23 as well as kind of the cover composition used in the production of the golf ball are shown. Those of the gold balls of Examples 24 to 28, those of the golf balls of Comparative Examples 12 to 15 and those of the golf balls of Comparative Examples 16 to 19 are shown in Tables 16, 17 and 18, respectively. The kind of the cover composition is shown by Preparation Example No. or Comparative Preparation Example No.

TABLE 11

| | Preparation Example No. | | | | |
|---|---|---|---|---|---|
| | 10 | 11 | 12 | 13 | 14 |
| Hi-milan 1605*1 | 20 | 20 | 20 | 15 | 25 |
| Hi-milan 1706*2 | 20 | 20 | 20 | 15 | 25 |
| Hi-milan 1855*3 | 30 | 30 | 30 | 40 | 20 |
| Bondine AX8390*9 | 20 | 15 | 0 | 0 | 0 |
| TUFTEC M1943*10 | 0 | 0 | 25 | 20 | 10 |
| TUFTEC Z513*12 | 10 | 0 | 5 | 0 | 0 |
| TUFTEC Z514*13 | 0 | 15 | 0 | 10 | 20 |
| Titanium dioxide | 2 | 2 | 2 | 2 | 2 |
| Stiffness modulus (MPa) | 150 | 135 | 145 | 120 | 160 |

TABLE 12

| | Preparation Example No. | | | | | |
|---|---|---|---|---|---|---|
| | 15 | 16 | 17 | 18 | 19 | 20 |
| Hi-milan 1605*1 | 20 | 0 | 0 | 25 | 0 | 0 |
| Hi-milan 1706*2 | 20 | 20 | 0 | 25 | 0 | 0 |
| Hi-milan 1855*3 | 30 | 30 | 20 | 0 | 0 | 40 |
| Hi-milan MK7320*4 | 0 | 20 | 0 | 0 | 0 | 0 |
| Surlyn AD8511*5 | 0 | 0 | 25 | 0 | 30 | 20 |
| Surlyn AD8512*6 | 0 | 0 | 25 | 0 | 30 | 20 |
| Hi-milan AM7316*7 | 0 | 0 | 0 | 0 | 10 | 0 |
| TUFTEC M1943*10 | 0 | 20 | 0 | 40 | 0 | 0 |
| AR-201*11 | 20 | 0 | 20 | 0 | 20 | 10 |
| TUFTEC Z514*13 | 10 | 5 | 10 | 10 | 10 | 10 |
| Titanium dioxide | 2 | 2 | 2 | 2 | 2 | 2 |
| Stiffness modulus (MPa) | 130 | 155 | 145 | 120 | 140 | 140 |

TABLE 13

| | Comparative Preparation Example No. | | | |
|---|---|---|---|---|
| | 7 | 8 | 9 | 10 |
| Hi-milan 1605*1 | 50 | 45 | 25 | 20 |
| Hi-milan 1706*2 | 50 | 45 | 25 | 20 |
| Hi-milan 1855*3 | 0 | 10 | 40 | 40 |
| Bondine AX8390*9 | 0 | 0 | 10 | 0 |
| TUFTEC M1943*10 | 0 | 0 | 0 | 20 |
| Titanium dioxide | 2 | 2 | 2 | 2 |
| Stiffness modulus (MPa) | 340 | 270 | 170 | 150 |

TABLE 14

| | Comparative Preparation Example No. | | | |
|---|---|---|---|---|
| | 11 | 12 | 13 | 14 |
| Hi-milan 1605*1 | 25 | 25 | 30 | Balata cover *14 |
| Hi-milan 1706*2 | 25 | 25 | 30 | |
| Hi-milan 1855*3 | 35 | 0 | 0 | |
| Surlyn AD8269*8 | 0 | 0 | 40 | |
| Bondine AX8390*9 | 0 | 50 | 0 | |
| AR-201*11 | 15 | 0 | 0 | |
| Titanium dioxide | 2 | 2 | 2 | |
| Stiffness modulus (MPa) | 170 | 90 | 160 | 240 |

*1: Hi-milan 1605 (trade name), ethylene-methacrylic acid copolymer ionomer resin obtained by neutralizing with a sodium ion, manufactured by Mitsui Du Pont Polychemical Co., MI (melt index): 2.8, stiffness modulus: 310 MPa, shore D-scale hardness: 62.
*2: Hi-milan 1706 (trade name), ethylene-methacrylic acid copolymer ionomer resin obtained by neutralizing with a zinc ion, manufactured by Mitsui Du Pont Polychemical Co., MI: 0.8, stiffness modulus: about 260 MPa, Shore-D scale hardness: 61.
*3: Hi-milan 1855 (trade name), ethylene-butyl acrylate-methacrylic acid terpolymer ionomer resin obtained by neutralizing with a zinc ion, manufactured by Mitsui Du Pont Polychemical Co., MI: 1.0, stiffness modulus: about 90 MPa, Shore-D scale hardness: 55.
*4: Hi-milan MK7320 (trade name), ethylene-methacrylic acid copolymer ionomer resin obtained by neutralizing with a potassium ion, manufactured by Mitsui Du Pont Polychemical Co., MI: 2.8, stiffness modulus: about 290 MPa, Shore-D scale hardness: 61.
*5: Surlyn AD8511 (trade name), ethylene-methacrylic acid copolymer ionomer resin obtained by neutralizing with a zinc ion, manufactured by Du Pont Co., MI: 3.4, stiffness modulus: about 220 MPa, Shore-D scale hardness: 60.
*6: Surlyn AD8512 (trade name), ethylene-methacrylic acid copolymer ionomer resin obtained by neutralizing with a sodium ion, manufactured by Du Pont Co., MI: 4.4, stiffness modulus: about 280 MPa, Shore-D scale hardness: 62.
*7: Hi-milan AM7316 (trade name), ethylene-butyl acrylate-methacrylic acid terpolymer ionomer resin obtained by neutralizing with a zinc ion, manufactured by Mitsui Du Pont Polychemical Co., MI: 3.0, stiffness modulus: about 24 MPa, Shore-D scale hardness: 34.
*8: Surlyn AD8269 (trade name), ethylene-butyl acrylate-methacrylic acid terpolymer resin obtained by neutralizing with a zinc ion, manufactured by Du Pont Co., MI: 1.0, stiffness modulus: 26 MPa, Shore-D scale hardness: 36.
*9: Bondine AX8390 (trade name), ethylene-ethyl acrylatemaleic anhydride terpolymer, manufactured by Sumitomo Chemical Industries Co., MI: 7.0, stiffness modulus:<10 MPa, content of ethyl acrylate+maleic anhydride: 32% (maleic anhydride content: 1 to 4%).
*10: TUFTEC M1943 (trade name), maleic anhydride adduct of styrene-butadiene-styrene block copolymer, manufactured by Asahi Kasei Industries Co. Ltd., JIS-A hardness: 67, styrene content: about 20% by weight.
*11: AR-201 (trade name), graft modified product of ethylene-ethyl acrylate copolymer due to maleic anhydride, manufactured by Mitsui Du Pont Polychemical Co., JIS-A hardness: 51.
*12: TUFTEC Z513 (trade name), glycidyl methacrylate adduct of hydrogenated styrene-butadiene-styrene block copolymer, manufactured by Asahi Kasei Industries Co. Ltd., JIS-A hardness: 84, styrene content: about 30% by weight, hydrogenated butadiene content: about 70% by weight, glycidyl methacrylate content: about 1% by weight.
*13: TUFTEC Z514 (trade name), glycidyl methacrylate adduct of hydrogenated styrene-butadiene-styrene block copolymer, manufactured by Asahi Kasei Co. Ltd., JIS-A hardness: 65, styrene content: about 20% by weight, hydrogenated butadiene content: about 80% by weight, glycidyl methacrylate content: about 1% by weight.
*14: Balata cover. Normal balata cover composition

TABLE 15

|  | Examples | | | | |
| --- | --- | --- | --- | --- | --- |
|  | 19 | 20 | 21 | 22 | 23 |
| Cover composition (Preparation Example No.) | 10 | 11 | 12 | 13 | 14 |
| Ball weight (g) | 45.4 | 45.3 | 45.4 | 45.4 | 45.3 |
| Ball compression | 86 | 85 | 86 | 85 | 86 |
| Ball initial velocity (feet/second) | 252.9 | 252.8 | 252.9 | 252.7 | 252.9 |
| Flight distance (yard) | 229 | 228 | 230 | 228 | 229 |
| Spin (rpm) | 8450 | 8550 | 8500 | 8650 | 8400 |
| Durability (index) | 275 | 300 | 280 | 315 | 265 |
| Cut resistance | ◯ | ◯ | ◯ | ◯ | ◯ |
| Shot feel | ◯ | ◯ | ◯ | ◯ | ◯ |
| Controllability | ◯ | ◯ | ◯ | ◯ | ◯ |

TABLE 16

|  | Example No. | | | | |
| --- | --- | --- | --- | --- | --- |
|  | 24 | 25 | 26 | 27 | 28 |
| Cover composition (Preparation Example No.) | 15 | 16 | 17 | 18 | 19 |
| Ball weight (g) | 45.3 | 45.3 | 45.4 | 45.4 | 45.3 |
| Ball compression | 85 | 86 | 86 | 85 | 86 |
| Ball initial velocity (feet/second) | 252.8 | 253.0 | 252.9 | 252.8 | 253.0 |
| Flight distance (yard) | 228 | 229 | 229 | 228 | 229 |
| Spin (rpm) | 8600 | 8450 | 8550 | 8650 | 8550 |
| Durability (index) | 300 | 275 | 285 | 310 | 285 |
| Cut resistance | ◯ | ◯ | ◯ | ◯ | ◯ |
| Shot feel | ◯ | ◯ | ◯ | ◯ | ◯ |
| Controllability | ◯ | ◯ | ◯ | ◯ | ◯ |

TABLE 17

|  | Comparative Example No. | | | |
| --- | --- | --- | --- | --- |
|  | 12 | 13 | 14 | 15 |
| Cover composition (Comparative Preparation Example No.) | 7 | 8 | 9 | 10 |
| Ball weight (g) | 45.3 | 45.4 | 45.4 | 45.4 |
| Ball compression | 86 | 85 | 83 | 84 |
| Ball initial velocity (feet/second) | 252.7 | 252.3 | 250.9 | 251.0 |
| Flight distance (yard) | 229 | 229 | 222 | 223 |
| Spin (rpm) | 7000 | 7300 | 7900 | 8150 |
| Durability (index) | 120 | 160 | 210 | 225 |
| Cut resistance | ◯ | ◯ | Δ | Δ |
| Shot feel | X | X | ◯ | ◯ |
| Controllability | X | X | ◯ | ◯ |

TABLE 18

|  | Comparative Examples No. | | | |
| --- | --- | --- | --- | --- |
|  | 16 | 17 | 18 | 19 |
| Cover composition (Comparative Preparation Example No.) | 11 | 12 | 13 | 14 |
| Ball weight (g) | 45.3 | 45.3 | 45.4 | 45.4 |
| Ball compression | 84 | 83 | 84 | 85 |
| Ball initial velocity (feet/second) | 251.2 | 250.5 | 251.3 | 251.2 |
| Flight distance (yard) | 223 | 217 | 223 | 223 |
| Spin (rpm) | 7950 | 9300 | 8050 | 8500 |
| Durability (index) | 210 | 110 | 220 | 100 |

TABLE 18-continued

|  | Comparative Examples No. | | | |
| --- | --- | --- | --- | --- |
|  | 16 | 17 | 18 | 19 |
| Cut resistance | Δ | XX | Δ | XX |
| Shot feel | ◯ | X | ◯ | ◯ |
| Controllability | ◯ | ◯ | ◯ | ◯ |

As is apparent from a comparison between the characteristics of the golf balls of Examples 19 to 28 shown in Tables 15 to 16 and those of the golf balls of Comparative Examples 12 to 19 shown in Tables 17 to 18, the golf balls of the Examples 19 to 28 attained the flight distance of 228 to 230 yards, which is almost the same as that of the golf ball of Comparative Example 12 wherein only a high-rigid ionomer resin is used as the base resin for the cover and the flyight performance was excellent. In addition, the golf balls of Examples 19 to 28 showed a large spin amount and were superior in shot feel, controllability, durability and cut resistance.

The durability will be explained in detail. The golf balls of Examples 19 to 28 showed an index, which indicates the durability, of 275 to 315 and have an excellent durability corresponding to a durability which is 2.75 to 3.15 times as strong as that of the golf ball covered with the balata cover of Comparative Examples 19. As a matter of course, they are by far superior in durability to the golf ball of Comparative Example 19 and are superior in durability to the golf balls covered with the soft cover of Comparative Examples 14 to 18.

In addition, cut resistance will also be explained in detail. No cut mark was formed on the golf balls of Examples 19 to 28 and Comparative Examples 12 to 13, but a small cut mark was formed on the golf balls of Comparative Examples 14 to 16 and 18. In addition, a large cut mark which can not stand use is formed on the golf ball of Comparative Example 17. As a matter of course, a large cut mark which can not stand use is formed on the golf ball covered with the balata cover of Comparative Example 19.

On the other hand, the golf balls of Comparative Examples 12 to 13 wherein only a high-rigid ionomer resin is used as the base resin were inferior in shot feel and controllability were inferior. The golf balls of Comparative Examples 14 to 18 were 5 to 9 yards inferior in flight distance to the golf balls of the Comparative Examples 19 to 28. That is, the golf balls of Comparative Examples 14 to 17 wherein the glycidyl group-modified styrene-based copolymer [e.g. TUFTEC Z513, TUFTEC Z514 (both are trade name)] is not formulated and only ionomer resin and maleic anhydride-modified olefin copolymer are used and golf ball of Comparative Example 18 which was softened by using the soft ionomer resin were superior in shot feel and controllability, but were insufficient in flight performance.

In addition, the results of the practical test due to professional golfers will be explained in detail as follows.

The golf balls of Examples 19 to 28 have shot feel and controllability, which are similar to those of the golf ball covered with the balata cover of Comparative Example 19, and the flight distance reached to the satisfactory level. However, the golf balls of Comparative Examples 12 to 13 wherein only an ionomer resin is used as the base resin for the cover showed a hard shot feel, and spin is not easily put and controllability was inferior. The golf balls of Comparative Examples 14 to 18 were superior in shot feel and controllability, but were inferior in flight distance.

Examples 29 to 33 and Comparative Examples 20 to 23

(1) Production of core

A rubber composition prepared by formulating 36 parts by weight of zinc acrylate, 20 parts by weight of zinc oxide, 1.2 parts by weight of dicumyl peroxide and 0.5 parts by weight of an antioxidant [Yoshinox 425 (trade name), manufactured by Yoshitomi Seiyaku Co., Ltd.] in 100 parts by weight of a polybutadiene rubber [BR-11 (trade name), manufactured by Japan Synthetic Rubber Co., Ltd] was subjected to a vulcanization molding at 160° C. for 25 minutes to give a solid core. The average diameter of the solid core thus obtained was 38.2 mm.

(2) Preparation of cover composition

Among the cover compositions prepared in the above Preparation Examples and Comparative Preparation Examples, cover compositions of Preparation Examples 11, 13, 15, 17 and 20 were used for Preparation Examples, and those of Comparative Preparation Examples 7, 9, 10 and 13 were used for Comparative Preparation Examples.

(3) Production of golf ball

The cover composition obtained in the above item (2) was covered on the solid core obtained in the above item (1) by an injection molding to give a coated golf ball of 42.7 mm in diameter.

The ball weight, ball compression, ball initial velocity, flight distance, durability, cut resistance, shot feel and controllability of the golf ball thus obtained were examined.

In Table 19, the ball weight, ball compression, ball initial velocity, flight distance, spin, durability, cut resistance, shot feel and controllability of the golf balls of Examples 29 to 33 as well as kind of the cover composition used in the production of the golf ball are shown. Those of the golf balls of Comparative Examples 20 to 23 are shown in Table 20. The kind of the cover composition is shown by Preparation Example No. or Comparative Preparation Example No. Further, the measuring method of various physical properties and evaluation method of shot feel and controllability are the same as those of Example 19.

TABLE 19

| | Example No. | | | | |
|---|---|---|---|---|---|
| | 29 | 30 | 31 | 32 | 33 |
| Cover composition (Preparation Example No.) | 11 | 13 | 15 | 17 | 20 |
| Ball weight (g) | 45.4 | 45.3 | 45.4 | 45.3 | 45.4 |
| Ball compression | 92 | 91 | 91 | 92 | 92 |
| Ball initial velocity (feet/second) | 252.9 | 252.8 | 252.8 | 253.0 | 253.0 |
| Flight distance (yard) | 230 | 229 | 229 | 230 | 230 |
| Spin (rpm) | 8500 | 8600 | 8550 | 8500 | 8500 |
| Durability (index) | 310 | 330 | 315 | 275 | 300 |
| Cut resistance | ◯ | ◯ | ◯ | ◯ | ◯ |
| Shot feel | ◯ | ◯ | ◯ | ◯ | ◯ |
| Controllability | ◯ | ◯ | ◯ | ◯ | ◯ |

TABLE 20

| | Comparative Example No. | | | |
|---|---|---|---|---|
| | 20 | 21 | 22 | 23 |
| Cover composition (Comparative Preparation Example No.) | 10 | 12 | 13 | 16 |
| Ball weight (g) | 45.3 | 45.4 | 45.3 | 45.3 |
| Ball compression | 102 | 90 | 90 | 93 |
| Ball initial velocity (feet/second) | 253.0 | 251.5 | 251.0 | 250.8 |
| Flight distance (yard) | 230 | 223 | 223 | 222 |
| Spin (rpm) | 6900 | 7800 | 8050 | 8000 |
| Durability (index) | 125 | 220 | 230 | 225 |
| Cut resistance | ◯ | Δ | Δ | Δ |
| Shot feel | X | ◯ | ◯ | ◯ |
| Controllability | X | ◯ | ◯ | ◯ |

As is apparent from a comparison between the characteristics of the golf balls of Examples 29 to 33 shown in Table 19 and those of the golf balls of Comparative Examples 20 to 23 shown in Table 20, the two-piece solid golf balls of Examples 29 to 33 of the present invention had excellent spin performance, shot feel, controllability, flight performance, durability and cut resistance, similar to the golf balls of Examples 19 to 28.

That is, the golf balls of Examples 29 to 33 attained the flight distance of 229 to 230 yards, which is almost the same as that of the golf ball of Comparative Example 20 wherein only a high-rigid ionomer resin is used as the base resin. In addition, the golf balls of Examples 29 to 33 showed a large spin amount and were superior in shot feel and controllability, durability and cut resistance.

To the contrary, the golf ball of Comparative Example 20 wherein only a high-rigid ionomer resin is used as the cover resin of the cover was superior in flight performance, but were inferior in shot feel and controllability. The golf balls of Comparative Examples 21 to 23 were superior in shot feel and controllability, but they were 6 to 8 yards inferior in flight distance to the golf balls of Examples 29 to 33.

What is claimed is:

1. A golf ball having a core and a cover for covering the core, wherein said cover has a stiffness modulus of 100 to 250 MPa and comprises a heated mixture of an ionomer resin and a glycidyl group-modified styrene-based block copolymer having a JIS-A hardness of 30 to 90 as base resin.

2. The golf ball according to claim 1, wherein a mixing weight ratio of ionomer resin to glycidyl group-modified styrene-based block copolymer having a JIS-A hardness of 30 to 90 is 95:5 to 50:50.

3. The golf ball of according to claim 1, wherein a styrene-based block copolymer moiety in the glycidyl group-modified styrene-based block copolymer having a JIS-A hardness of 30 to 90 is a block copolymer of polystyrene and poly(ethylene-butylene).

4. The golf ball according to claim 1, wherein a styrene content of the styrene-based block copolymer moiety in the glycidyl group-modified styrene-based block copolymer having a JIS-A hardness of 30 to 90 is 10 to 40% by weight.

5. The golf ball according to claim 1, wherein a glycidyl group content of the glycidyl group-modified styrene-based block copolymer having a JIS-A hardness of 30 to 90 is 0.05 to 10% by weight.

6. The golf ball according to claim 1, wherein the ionomer resin is obtained by neutralizing with a metal ion at least a part of carboxyl groups in a copolymer of an α-olefin and an α, β-unsaturated carboxylic acid having 3 to 8 carbon atoms, or neutralizing with a metal ion at least a part of carboxyl groups in a terpolymer of an α-olefin, an α, β-unsaturated carboxylic acid having 3 to 8 carbon atoms and an α, β-unsaturated carboxylate.

7. The golf ball according to claim 1, wherein the glycidyl group-modified styrene-based block copolymer has a JIS-A hardness of 45 to 88.

8. The golf ball according to claim 4, wherein styrene content of the styrene-based block copolymer moiety of the glycidyl group-modified styrene based block copolymer is 15 to 35% by weight.

9. The golf ball according to claim 1, wherein a glycidyl group content of the glycidyl group-modified styrene-based block copolymer having a JIS-A hardness of 30 to 90 is 0.2 to 5% by weight.

10. The golf ball according to claim 1, wherein a mixing weight ratio of ionomer resin to glycidyl group-modified styrene-based block copolymer having a JIS-A hardness of 30 to 90 is 90:10 to 55:45.

11. The golf ball according to claim 1, wherein the glycidyl group-modified block copolymer is a glycidyl methacrylate adduct of hydrogenated styrene-butadiene-styrene block copolymer.

12. A golf ball having a core and a cover for covering the core, wherein said cover has a stiffness modulus of 100 to 250 MPa and comprises a heated mixture of an ionomer resin, a maleic anhydride-modified olefin copolymer and a glycidyl group-modified styrene-based block copolymer having a JIS-A hardness of 30 to 90 as base resin.

13. The golf ball according to claim 12, wherein the heated mixture is obtained by mixing 30 to 70% by weight of the ionomer resin, 10 to 69.5% by weight of the maleic anhydride-modified olefin copolymer and 0.5 to 20% by weight of the glycidyl group-modified styrene-based block copolymer with heating.

14. The golf ball according to claim 12, wherein a base polymer of the ionomer resin is at least one sort selected from the group consisting of ethylene-acrylic acid copolymer, ethylene-methacrylic acid copolymer and terpolymer of ethylene-methacrylic acid-acrylate.

15. The golf ball according to claim 12, wherein the maleic anhydride-modified olefin copolymer is a maleic anhydride adduct of a hydrogenated block copolymer of styrene-butadiene-styrene block copolymer.

16. The golf ball according to claim 12, wherein the maleic anhydride-modified olefin copolymer is that obtained by subjecting an ethylene-ethyl acrylate-maleic anhydride terpolymer or an ethylene-ethyl acrylate copolymer to graft modification using maleic anhydride.

17. The golf ball according to claim 12, wherein a base polymer of the glycidyl group-modified styrene-based block copolymer is a hydrogenated styrene-butadiene-styrene block copolymer.

18. The golf ball according to claim 12, wherein the glycidyl group-modified styrene-based block copolymer is a glycidyl methacrylate adduct of a hydrogenated styrene-butadiene-styrene block copolymer.

19. The golf ball according to claim 12, wherein the styrene content of the styrene-based block copolymer moiety in the glycidyl group-modified styrene-based block copolymer is 10 to 40% by weight and the glycidyl group content of the glycidyl group-modified styrene-based block copolymer is 0.05 to 10% by weight.

* * * * *